OCR of US Patent cover page US 9,823,936 B2

(12) United States Patent
Baklanovs

(10) Patent No.: US 9,823,936 B2
(45) Date of Patent: Nov. 21, 2017

(54) ASSISTIVE TECHNOLOGY DURING INTERACTIVE COMPUTER USE

(71) Applicant: International Business Machines Corporation, Armonk, NY (US)

(72) Inventor: Aleksandrs Baklanovs, Newcastle upon Tyne (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 437 days.

(21) Appl. No.: 14/469,729

(22) Filed: Aug. 27, 2014

(65) Prior Publication Data
US 2015/0121219 A1    Apr. 30, 2015

(30) Foreign Application Priority Data
Oct. 24, 2013  (GB) .................................. 1318776.0

(51) Int. Cl.
*G06F 3/0482* (2013.01)
*G06F 9/44* (2006.01)
(Continued)

(52) U.S. Cl.
CPC .......... *G06F 9/4446* (2013.01); *G06F 3/0481* (2013.01); *G06F 11/3438* (2013.01); *G06F 17/30312* (2013.01)

(58) Field of Classification Search
CPC .. G06F 3/0482; G06F 17/3089; G06F 9/4446; G06F 3/0481; G05B 19/404
(Continued)

(56) References Cited

U.S. PATENT DOCUMENTS 6,466,897 B1   10/2002  Yoshida
7,743,340 B2*   6/2010  Horvitz ................ G05B 19/404
                                                 715/710
(Continued)

FOREIGN PATENT DOCUMENTS

JP    H07306847    11/1995

OTHER PUBLICATIONS

Demacare, D5.2 Multi-Parametric Behavior Interpretation v1, Dementia Ambient Care: Multi-Sensing Monitoring for Intelligent Remote Management and Decision Support, Dem@Care—FP7-288199, May 2013, 68 pages.
Hicks, et al., Research to inform development of a guide to online activities for people with dementia, Institute of Employment Studies, Report 498, Oct. 2012, 98 pages.
(Continued)

*Primary Examiner* — Andrey Belousov
(74) *Attorney, Agent, or Firm* — Cantor Colburn LLP; Nicholas Bowman

(57) ABSTRACT

According to an aspect a method for providing assistive technology during interactive computer use includes monitoring a plurality of interactions of a user with a computer system and collecting data relating to the interactions of the user by an assistive tool executing on a processor. The assistive tool analyzes the collected data to build and store a plurality of patterns of the interactions of the user. A delay is detected in a current activity of the user on the computer system. Data is retrieved relating to one or more prior interactions that the user has carried out. The retrieved data is matched with the stored patterns of the interactions of the user. One or more probable next steps in the current activity of the user are determined based on the matching. The assistive tool suggests at least one of the one or more probable next steps to the user.

17 Claims, 7 Drawing Sheets

(51) Int. Cl.
*G06F 3/0481* (2013.01)
*G06F 17/30* (2006.01)
*G06F 11/34* (2006.01)

(58) Field of Classification Search
USPC ........ 715/710, 708, 762, 705, 707, 709, 714
See application file for complete search history.

(56) References Cited

U.S. PATENT DOCUMENTS

| | | | |
|---|---|---|---|
| 8,875,038 B2* | 10/2014 | Ismalon | G06F 17/3089 715/708 |
| 2006/0106854 A1 | 5/2006 | Haigh et al. | |
| 2007/0222772 A1 | 9/2007 | Amick | |
| 2009/0064000 A1* | 3/2009 | Garbow | G06F 3/0482 715/762 |
| 2012/0011211 A1 | 1/2012 | Smith | |
| 2012/0011570 A1 | 1/2012 | Griffin | |

OTHER PUBLICATIONS

M. Gloor, Physical Design of a Video phone for people with mild dementia, Master Programme in Human-Computer Interaction, Oct. 2010, 61 pages.
M. Pollack, Intelligent Technology for an Aging Population, The Use of AI to Assist Elders with Cognitive Impairment, American Association of Artificial Intelligence, May 2005, 16 pages.
GB Application No. GB1318776.0 Search Report dated May 19, 2014, 1 page.

\* cited by examiner

ASSISTIVE TECHNOLOGY DURING INTERACTIVE COMPUTER USE

PRIORITY

The present application claims priority to Great Britain Patent Application No. 1318776.0, filed on Oct. 24, 2013, and all the benefits accruing therefrom under 35 U.S.C. §119, the contents of which are incorporated by reference in its entirety herein.

FIELD OF INVENTION

This invention relates to the field of assistive technology for people suffering from dementia or other cognitive affecting illnesses. In particular, the invention relates to providing assistive technology during interactive computer use.

BACKGROUND

Dementia is a non-specific illness syndrome in which affected areas of cognition may be memory, attention, language, and problem solving. Other illnesses or disabilities may also affect these areas of cognition.

People suffering from dementia, or similarly affecting conditions, have problems using software on a computer where numerous steps are required as they may get confused mid-way through a process. While using software, a user with impaired cognition, may forget the previous step or steps that they have taken. They may also get confused as to the operation they were in the process of carrying out or about to carry out.

As process steps in computer software use are often repetitive or similar in nature, steps may be easily confused by a user resulting in mistakes being made in a process. Such steps may be difficult to correct as going back in a process may lead to further confusion resulting in frustration and an inability to complete the task.

SUMMARY

According to an aspect a method for providing assistive technology during interactive computer use includes monitoring a plurality of interactions of a user with a computer system and collecting data relating to the interactions of the user by an assistive tool executing on a processor. The assistive tool analyzes the collected data to build and store a plurality of patterns of the interactions of the user. A delay is detected in a current activity of the user on the computer system. Data is retrieved relating to one or more prior interactions that the user has carried out. The retrieved data is matched with the stored patterns of the interactions of the user. One or more probable next steps in the current activity of the user are determined based on the matching. The assistive tool suggests at least one of the one or more probable next steps to the user.

According to another aspect, a system for providing assistive technology during interactive computer use includes an assistive tool including a plurality of instructions stored in a system memory that when executed by a processor of the system implements a plurality of components. The components include a monitoring component for monitoring a plurality of interactions of a user with a computer system and collecting data relating to the interactions of the user. The components also include a data analysis component for analyzing the collected data to build and store a plurality of patterns of the interactions of the user, and a delay detection component for detecting a delay in a current activity of the user. A current activity component is for retrieving data relating to one or more prior interactions that the user has carried out. A pattern matching component is for matching the retrieved data with stored patterns of the interactions of the user and determining one or more probable next steps in the current activity of the user. A suggestion component is for suggesting at least one of the one or more probable next steps to the user.

An additional aspect is a computer program product for providing assistive technology during interactive computer use. The computer program product includes a computer readable storage medium readable by a processing circuit and storing instructions for execution by the processing circuit for performing the method as described above and in further detail herein.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding. However, it will be understood by those skilled in the art that embodiments of the present invention may be practiced without these specific details. In other instances, well-known methods, procedures, and components have not been described in detail so as not to obscure the description.

Methods and systems are provided to keep track of actions performed by a computer software user, to determine a logical block to which specific patterns of actions relate, and, should the user stop mid-way through a process, remind the user of the steps already taken and/or the steps to follow.

Figure 1:
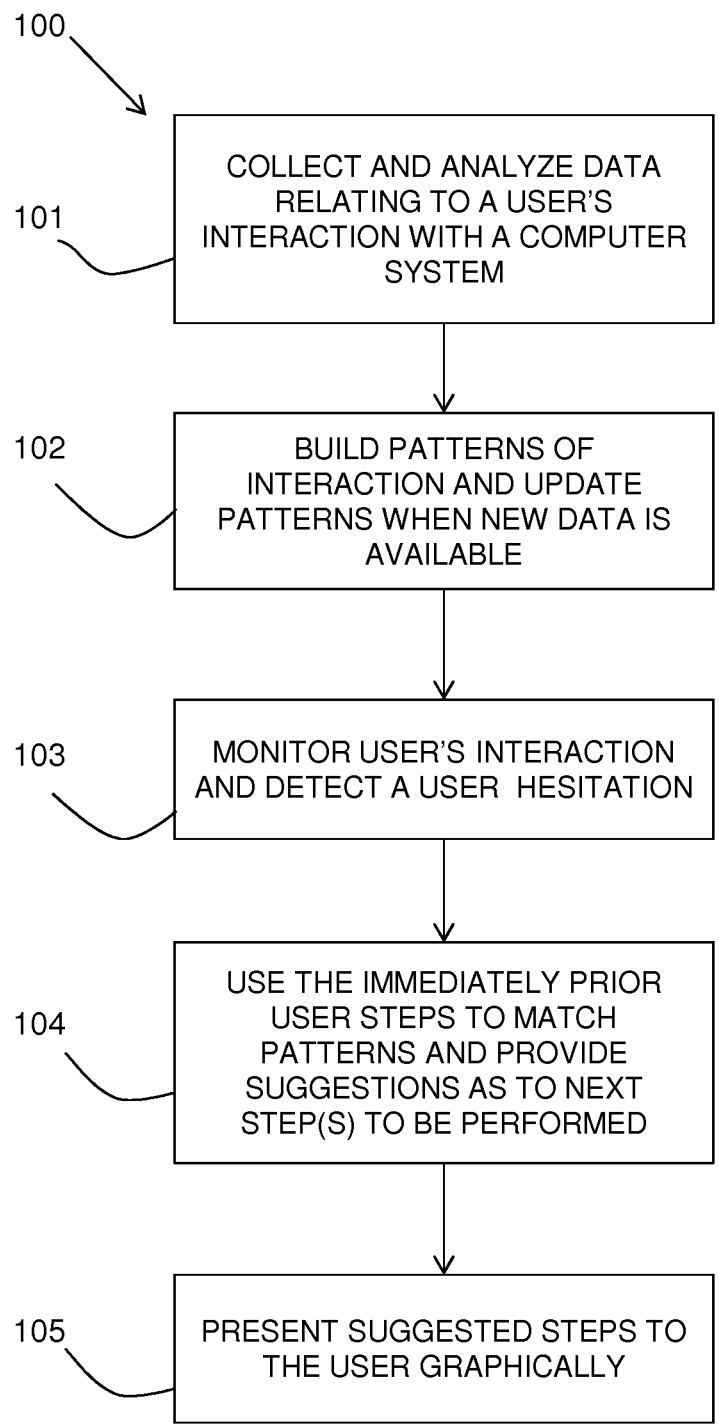
FIG. 1 is a flow diagram of an example embodiment of a method in accordance with the present invention.

Referring to FIG. 1, a flow diagram 100 illustrates an example embodiment of a described method.

At block 101, a tool is provided for monitoring a user's computer system and collecting and analyzing data relating to the user's interaction with the computer system. The monitoring may be carried out for all interactions with the computer system, or for specific computer programs or activities carried out by the user.

At block 102, the tool may build and store patterns of interaction and may update the patterns as new data is collected and analyzed, thereby providing a dynamically changing overview of the user's habitual interaction with the computer system.

At block 103, the monitoring of the user's interaction with the computer system may also be used to detect a hesitation or delay in the user activity indicating that the user may have lost track of the process he was carrying out. The hesitation may be detected by various methods described further below but generally recognizes an uncharacteristic delay in the user's interaction with the computer system.

At block 104, the steps carried out immediately prior to the detected hesitation are used, plus, optionally, other characteristics of the use, to match to stored patterns of the user interaction and to provide suggestions as to the next step(s) that should be performed by the user.

At block 105, one or more suggested steps may be presented to the user graphically and/or audibly depending on a user's preference.

The method includes the aspects of: tracking user interactions and storing data; using data to predict an intended outcome; and graphically presenting possible suggestions to the user dynamically.

Figure 2:
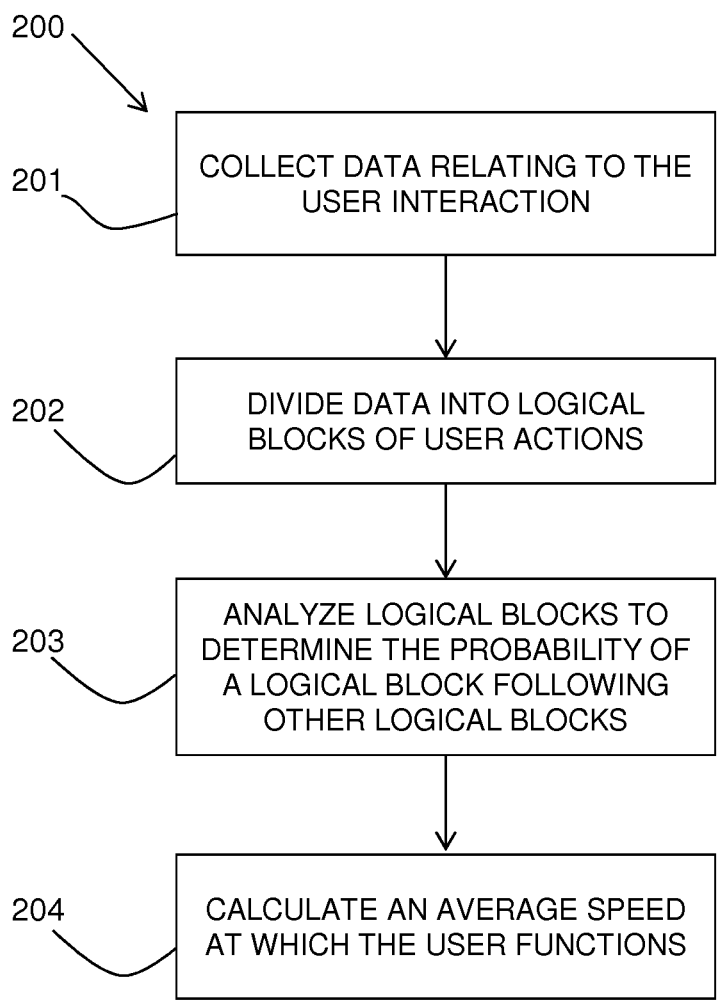
FIG. 2 is a flow diagram of an aspect of the example embodiment of FIG. 1 in accordance with the present invention.

Referring to FIG. 2, a flow diagram 200 illustrates an example embodiment of the aspects of blocks 101 and 102 of FIG. 1 of collecting and analyzing data relating to a user's interaction with a computer system.

At block 201, the tool may collect data relating to different aspects of the user's interaction with the computer system. The data may include inputs made to the computer system by the user via any input device such as a keyboard, mouse, touchpad, microphone, etc. The data may also include the processes carried out by the computer system in response to the user inputs.

The tool may constantly listen for user actions through the input devices and may look for computer actions performed in relation to the currently active window that might correspond to the user actions. The tool may also contain an in-built timer that may calculate the times between user actions. When an action or set of actions produces a computer action, the tool may map the action(s) to a specific result, storing the mapping as an atomic block of action-→reaction.

The data may further include the rate at which the user interacts with the computer system, including different rates for carrying out different tasks, and the time of day and the day or date the interaction is carried out.

At block 202, the collected data may be analyzed including dividing the data into logical blocks of actions. For example, the user may use a browser to look through products online and then put them in the shopping basket and purchase them—this may be considered a single logical block. The detail level of the logical blocks may be set depending on the required level of assistance needed.

The logical blocks may be assigned categories, for example, based on the activity to which they relate (shopping, reading news, checking emails, etc.).

At block 203, the logical blocks may then be analyzed to determine the probability of a logical block following other logical blocks. This analysis may include the frequency at which different logical blocks are used or at which blocks of a given category are used. The frequency may be extended to the frequency of patterns or series of logical blocks. The probability of a logical block following other logical blocks may be used with logical blocks containing similar patterns, in order to calculate the probabilities of usage of certain blocks or patterns.

The analysis at block 203 may keep track of patterns used throughout a day and possible approximate time windows when certain patterns are used.

At block 204, the tool may calculate the average speed at which the user functions. This may be determined with respect to the logical blocks of activities. This enables the tool to determine if a hesitation at a step is irregular for a particular user. The predefined period that the tool may wait before prompting the user may be altered depending on the average speed of normal operation for that user.

In general, the tool will perform more efficiently if it stores and analyzes more data to build a detailed picture of a user's activities.

The tool may collect data, arrange it into patterns, assign categories (shopping, reading news, checking emails, etc.) to those patterns, calculate probabilities based on frequency of usage, and search for connections between different patterns. This data collection may build an initial set of patterns which may be continually updated and expanded as further user data is collected and analyzed. The tool may keep collecting data and updates existing patterns, hypotheses and user speed.

Patterns may include interconnections. For example, a user may always check his/her email after reading the news.

An example of pattern probabilities is as follows. A user might access a grocery store website twice a week. Once to look through products and add them to the basket for a future purchase (this may habitually be carried out on Fridays, for example) and once to purchase the accumulated products (for example, on Saturdays). Both sets of logical blocks may be assigned to a "shopping" category. Both might include logical blocks of adding products to the shopping cart. However, only one sequence or pattern will involve checking out the products and paying. Both of the sets of actions (browsing and purchasing) happen at an equal frequency of once a week each. However, the probability of one event happening is higher than the other based on the day of the week when the user is performing the action. On a Friday, it is more probable that the user is browsing. On a Saturday, it is more probable that the user is about to make a purchase.

For certain patterns, sub-patterns may also be created to aid the user if they hesitate and get lost within a pattern. For example, a shopping pattern might include:
  i) Going to a shopping website;
  ii) Logging in;
  iii) Looking at the groceries;
  iv) Putting groceries in a shopping basket; and
  v) Checking them out.
  Step i) might consist of the sub-pattern of:
  a) typing in the name of the website; and
  b) pressing enter.
  Step ii) might consist of the sub-pattern of:
  a) typing in the username;
  b) typing in the password; and
  c) pressing "Log in"; etc.

Figure 3:
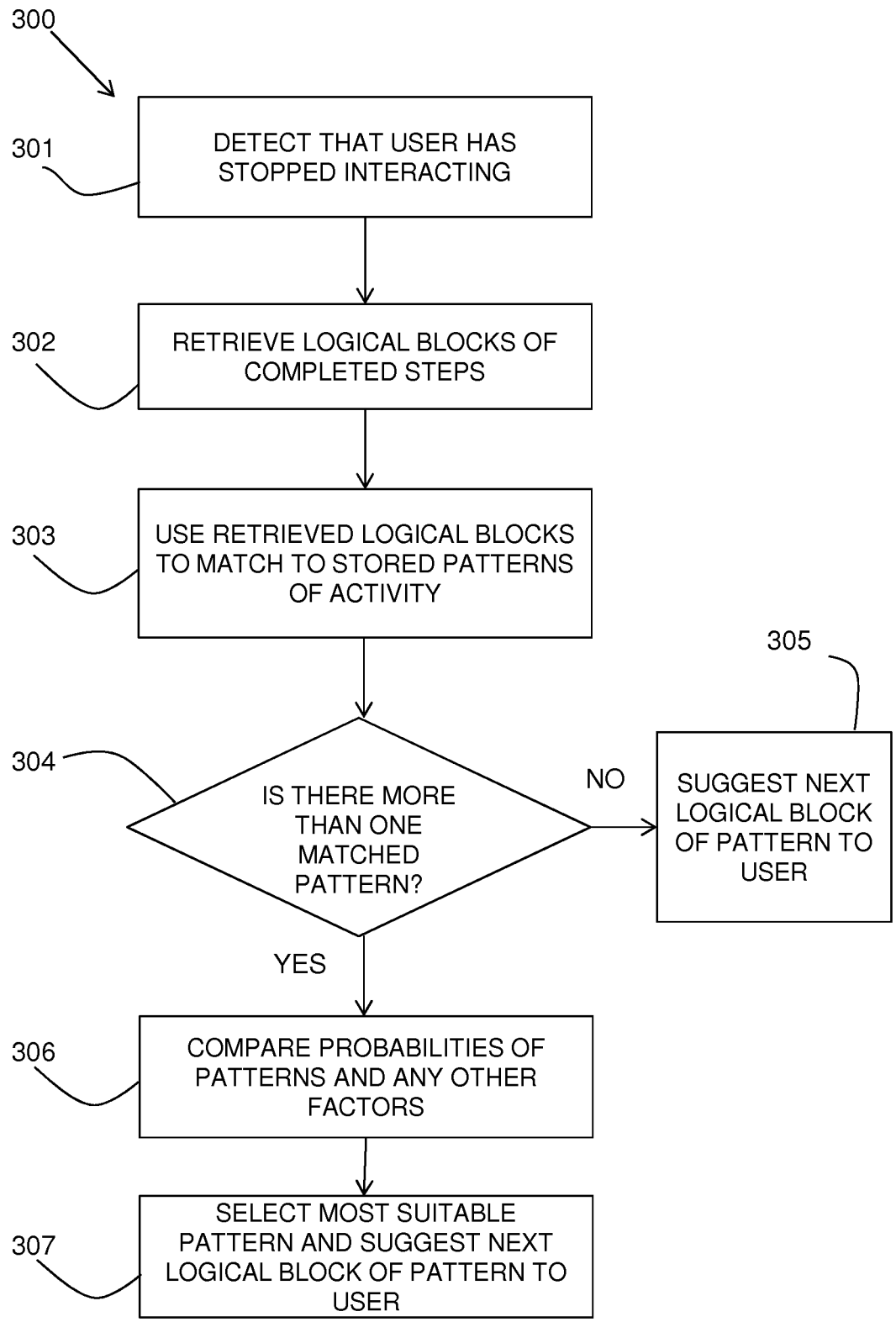
FIG. 3 is a flow diagram of a further aspect of the example embodiment of FIG. 1 in accordance with the present invention.

Referring to FIG. 3, a flow diagram 300 illustrates an example embodiment of the aspects of blocks 103 and 104 of FIG. 1 of monitoring the user's interaction to detect a hesitation and matching patterns to the user's activities.

At block 301, the tool may detect that a user stops interacting with the computer system midway through a pattern, for example, by failing to do anything within a pre-calculated average response time plus a given acceptable delay.

At block 302, the tool may have recorded that the user had just completed one or more logical blocks of activities and these logical blocks may be retrieved.

The completed one or more logical blocks of activities may be used at block 303 to match to stored patterns of logical blocks. In addition, other factors such as the time of the activity may be used for matching.

At block 304, it may be determined if there is more than one pattern that matches the user's activities. If there is only one pattern, then the next logical block in this pattern may be suggested at block 305 to the user as a prompt.

If there is more than one pattern that matches the user's activities, the probabilities of the patterns may be compared at block 306 and the most suitable pattern selected and suggested to the user at block 307.

Figure 4:
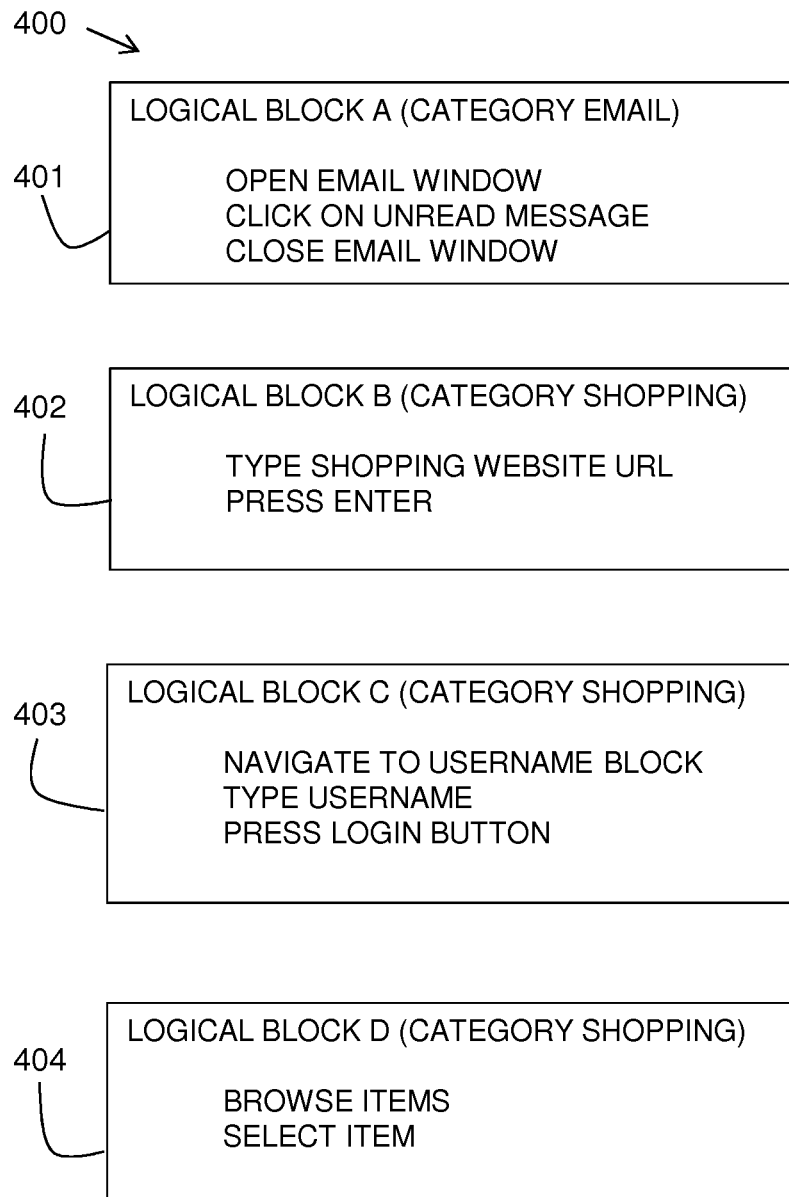
FIG. 4 is a schematic diagram illustrating aspects of a method in accordance with the present invention.

Referring to FIG. 4, a schematic diagram 400 illustrates example logical blocks which may be used to analyze and match user activities in the described methods and systems.

A first logical block A 401 may be created with a category of email checking. The logical block A 401 may include the user actions of opening an email window, clicking on an unread message, and closing the email window.

A second logical block B 402 may be created with a category of online shopping. The logical block B 402 may include the user actions of typing the shopping website URL, and pressing enter.

A third logical block C 403 may be created also with a category of online shopping. The logical block C 403 may include the user actions of navigating to a username block, typing the username, and pressing the login button.

A fourth logical block D 404 may be created also with a category of online shopping. The logical block D 404 may include the user actions of browsing items and selecting an item.

The logical blocks A to D 401-404 may often be repeated by a user. The pattern may be repeated at approximately the same time of day or on a particular day of the week.

However, if the user hesitates in this sequence, for example, after logical block C 403 and does not start browsing items, the described tool may prompt the user that they have logged in to the shopping website and they may now start browsing for items.

Figure 5:
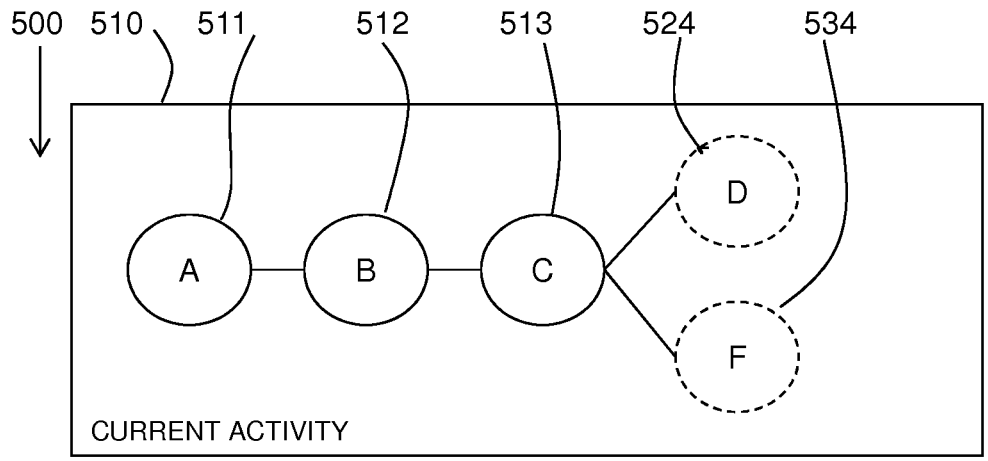
FIG. 5 is a schematic diagram illustrating aspects of a method in accordance with the present invention.
Figure 5:
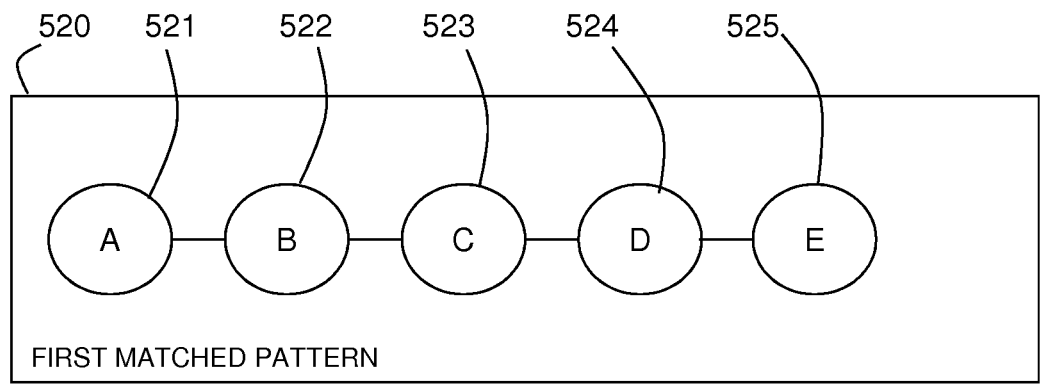
Figure 5:
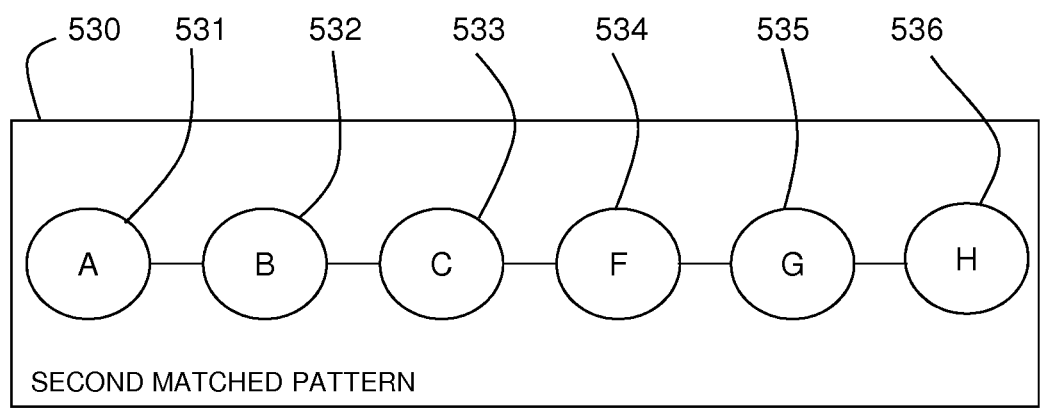

Referring to FIG. 5, a schematic diagram 500 illustrates an example embodiment of the described method. The figure shows a current sequence of logical blocks 510 in the form of blocks A 511, B 512, C 513. Known patterns are searched and two known patterns 520 and 530 may be matched.

The first matched pattern 520 may include logical blocks A 521, B 522, C 523, followed by logical blocks D 524, E 525.

The second matched pattern 530 may include logical blocks A 531, B 532, C 533, followed by logical blocks F 534, G 535, H 536.

If the user stops interacting with the computer on logical block C, the patterns show that the next block of activity may be either block D 524 or block F 534. The tool may look at both patterns 520, 530 and if the probability of the first one is sufficiently higher than of the other, the user will be reminded of the steps in the first pattern. If the probabilities are equal, or are within a certain threshold, the tool may try to search for more information, looking at typical contexts, dates, times when each pattern was normally used and comparing it with current circumstances.

The tool attempts to find the most probable of patterns and may communicate the steps performed so far and the steps to follow to the user. This may be communicated, for example, via a message box or voice message.

A dynamically changing list of potential patterns with steps matching to the ones already taken may be shown or otherwise provided to the user with propositions of possible next steps.

Should the user perform a step that is not contained in any of the stored patterns, a new pattern may be created.

The described methods may be adapted for use by more than one user, with an option to specify which user is currently using the computer system in a given session. For example, this may be of use in a family situation in which more than one person requires assistive technology, or for a publicly used computer system.

Figure 6:
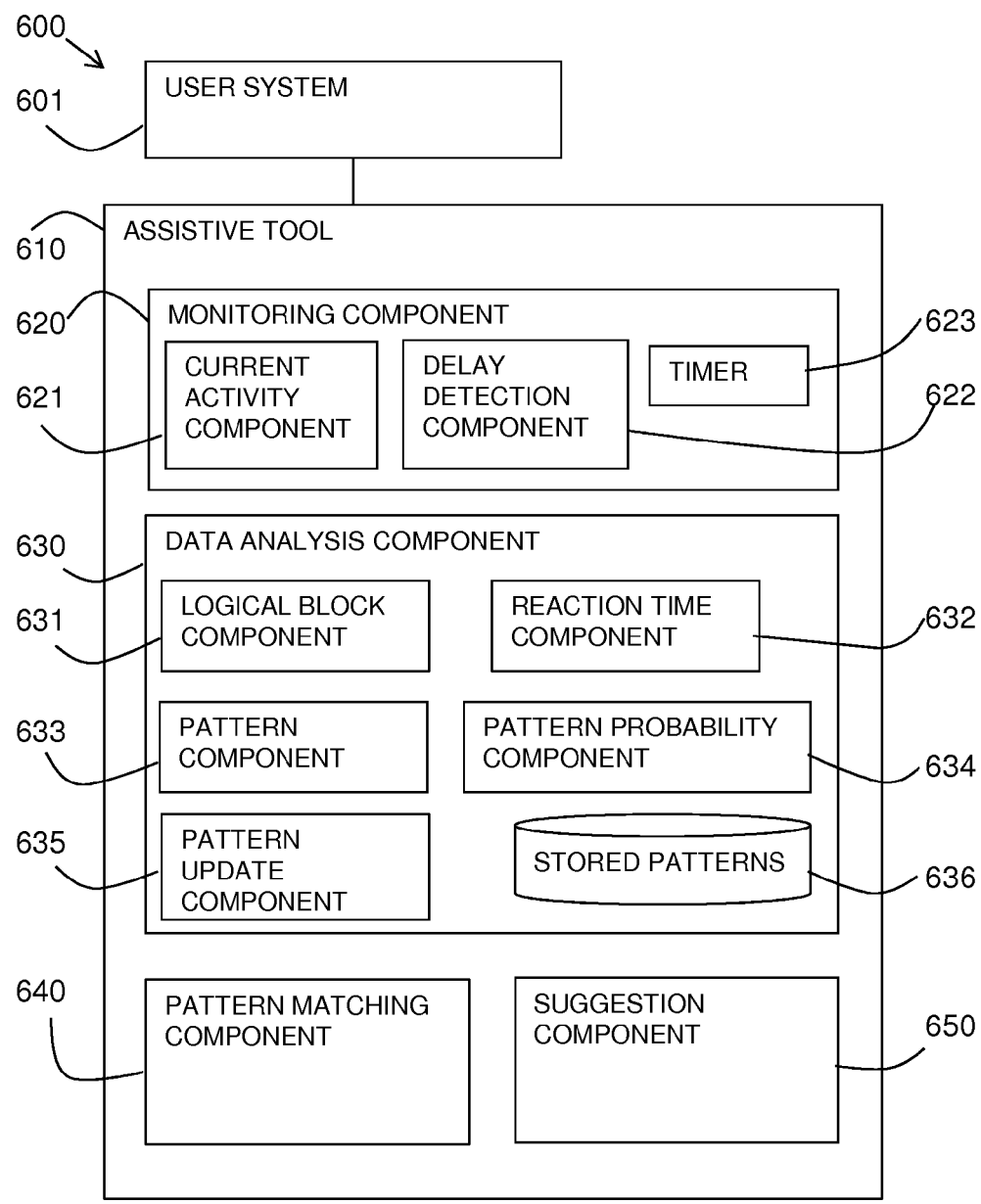
FIG. 6 is block diagram of an example embodiment of a system in accordance with the present invention.

Referring to FIG. 6, a block diagram shows an example embodiment of the described system 600 as a computer system 600.

A user system 601 may be any type of computing system used by a user. The computer system 600 may, for example, be a desktop or laptop computer, a tablet, a smart phone, etc.

An assistive tool 610 is described which may be provided on the user system 601 or via a network. The assistive tool 610 may have access to the events input and generated on or by the computer system 600.

The assistive tool 610 may include a monitoring component 620 for monitoring the user activity on the computer system 600. This may be by monitoring user inputs, processes carried out by the computer or other events. The monitoring component 620 may include a timer 623. The monitoring component 620 may collect data relating to the user activity. A current activity component 621 may monitor a user's current interaction for data collection and for recording the current steps if a hesitation occurs. The monitoring component 620 may also include a delay detection component 622 for detecting a delay or hesitation in the user activity.

A data analysis component 630 may include a logical block component 631 for dividing user activity into logical blocks and a pattern component 633 for determining patterns of activity in the form of sequences of the logical blocks. A pattern update component 635 is provided for continually or periodically updating the stored patterns 636. A pattern probability component 634 may be provided for calculating, based on the frequency of logical blocks and patterns, the probability that a pattern is followed given initial known steps.

The data analysis component 630 may also include a reaction time component 632 for determining the average reaction time of the user in order to determine if a hesitation occurs. This average reaction time is used by the delay detection component 622.

The assistive tool 610 may include a pattern matching component 640 for matching a current sequence of steps which may be defined as logical blocks with stored patterns to determine the most likely next step that the user should take. A suggestion component 650 may provide the suggested next step to the user via an interface with the user system 601.

Figure 7:
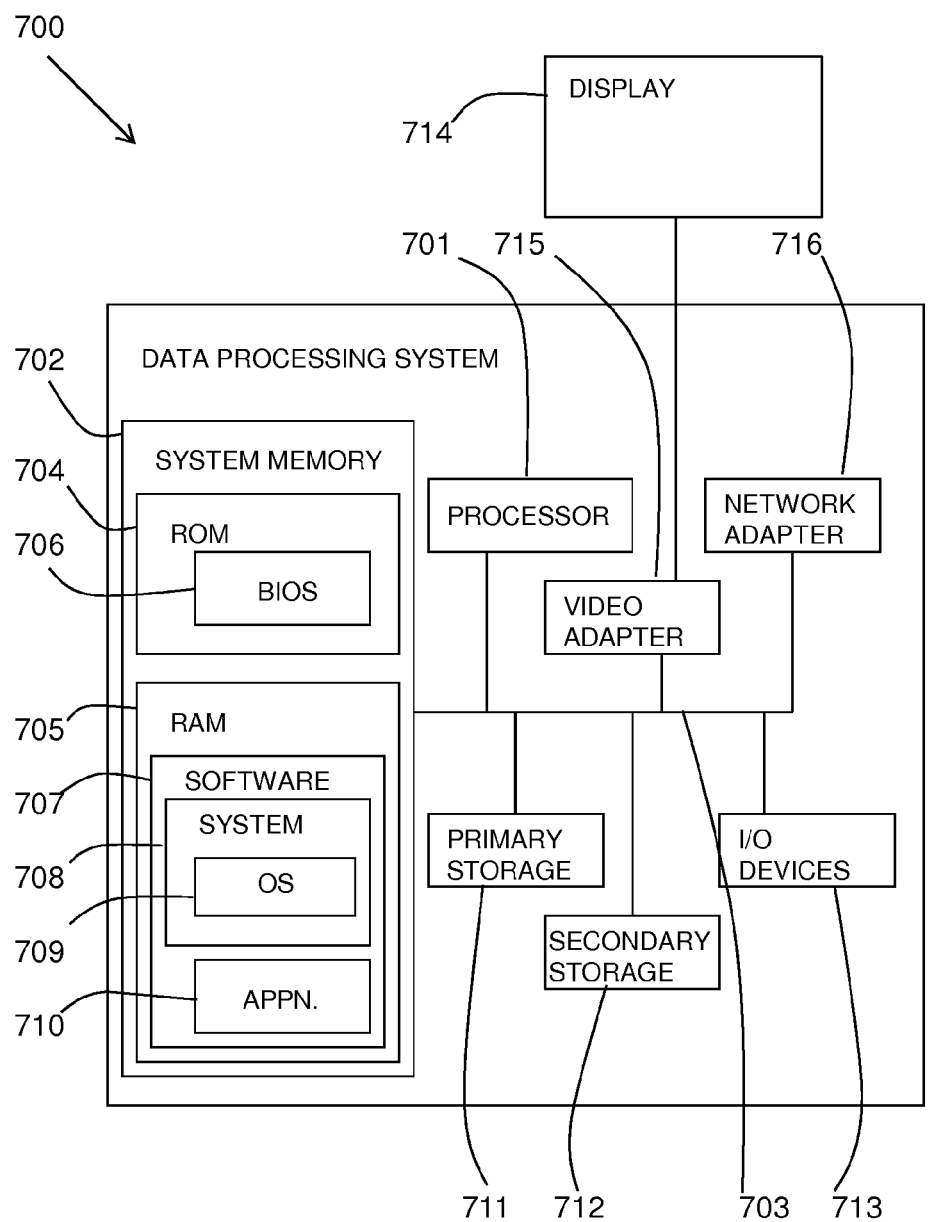
FIG. 7 is a block diagram of an embodiment of a computer system in which the present invention may be implemented.

Referring to FIG. 7, an exemplary system for implementing aspects of the invention includes a data processing system 700 as an embodiment of the computer system 600 of FIG. 6 that is suitable for storing and/or executing program code including at least one processor 701 (i.e., processing circuit) coupled directly or indirectly to memory elements through a bus system 703. The memory elements may include local memory employed during actual execution of the program code, bulk storage, and cache memories which provide temporary storage of at least some program code in order to reduce the number of times code must be retrieved from bulk storage during execution.

The memory elements may include system memory 702 in the form of read only memory (ROM) 704 and random access memory (RAM) 705. A basic input/output system (BIOS) 706 may be stored in ROM 704. System software 707 may be stored in RAM 705 including operating system software 708. Software applications 710 may also be stored in RAM 705.

The system 700 may also include a primary storage means 711 such as a magnetic hard disk drive and secondary storage means 712 such as a magnetic disc drive and an optical disc drive. The drives and their associated computer-readable media provide non-volatile storage of computer-executable instructions, data structures, program modules and other data for the system 700. Software applications may be stored on the primary and secondary storage means 711, 712 as well as the system memory 702.

The system 700 may operate in a networked environment using logical connections to one or more remote computers via a network adapter 716.

Input/output devices 713 may be coupled to the system either directly or through intervening I/O controllers. A user may enter commands and information into the system 700 through input devices such as a keyboard, pointing device, or other input devices (for example, microphone, joystick, game pad, satellite dish, scanner, or the like). Output devices may include speakers, printers, etc. A display device 714 is also connected to system bus 703 via an interface, such as video adapter 715.

In summary, an aspect for providing assistive technology during interactive computer use can include monitoring a user's interactions with a computer system and collecting data relating to the user's interactions; analyzing the collected data to build and store patterns of interaction for a user; detecting a delay in a user's current activity; retrieving monitored data relating to one or more prior interactions that the user has carried out; matching the retrieved data with stored patterns of interaction for the user; determining one or more probable next steps in the user's current activity; and suggesting the probable next steps to the user.

The monitoring and analyzing may be carried out dynamically to update the stored patterns and create new patterns based on on-going monitoring of the user's interactions.

Analyzing the collected data may include calculating an average speed of user interactions and using the average speed in detecting a delay in a user's current activity. Analyzing the collected data may also include dividing the collected data into logical blocks of user actions and building and storing patterns of the logical blocks. Analyzing the collected data may include determining a probability that a logical block follows a pattern of logical blocks.

Retrieving monitored data relating to one or more prior interactions may retrieve the recently monitored data and may divide it into logical blocks of user actions.

The patterns of interactions for a user may include time windows during which the patterns are carried out by the user.

If the matching results in more than one stored pattern, the method may select a stored pattern based on the probability of the pattern matching the retrieved monitored data.

According to another aspect, a system for providing assistive technology during interactive computer use includes: a monitoring component for monitoring a user's interactions with a computer system and collecting data relating to the user's interactions; a data analysis component for analyzing the collected data to build and store patterns of interaction for a user; a delay detection component for detecting a delay in a user's current activity; a current activity component for retrieving monitored data relating to one or more prior interactions that the user has carried out; a pattern matching component for matching the retrieved data with stored patterns of interaction for the user and determining one or more probable next steps in the user's current activity; and a suggestion component for suggesting the probable next steps to the user.

The monitoring component and the data analysis component may monitor and analyze the data dynamically to update the stored patterns and create new patterns based on on-going monitoring of the user's interactions.

The data analysis component for analyzing the collected data may include calculating an average speed of user interactions and using the average speed in detecting a delay in a user's current activity.

The data analysis component for analyzing the collected data may include dividing the collected data into logical blocks of user actions and building and storing patterns of the logical blocks. The data analysis component for analyzing the collected data may include determining a probability that a logical block follows a pattern of logical blocks.

The current activity component for retrieving monitored data relating to one or more prior interactions may retrieve the recently monitored data and divides it into logical blocks of user actions.

The patterns of interactions for a user may include time windows during which the patterns are carried out by the user.

The pattern matching component may be for selecting a stored pattern based on the probability of the pattern matching the retrieved monitored data.

According to a further aspect, a computer program product for providing assistive technology during interactive computer use can include: a computer readable storage medium readable by a processing circuit and storing instructions for execution by the processing circuit for performing a method as previously described.

According to an additional aspect, a computer program stored on a computer readable medium and loadable into the internal memory of a digital computer can include software code portions for performing a method as previously described when run on the digital computer.

The described aspects may provide an advantage of assisting a user who may have cognitive problems to interact effectively with a computer and for the computer to learn a particular user's habits and characteristics of usage to provide dedicated prompts.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. Improvements and modifications can be made to the foregoing without departing from the scope of the present invention.

What is claimed is:

1. A method for providing assistive technology during interactive computer use, the method comprising:
    monitoring a plurality of interactions of a user with a computer system and collecting data relating to the interactions of the user by an assistive tool executing on a processor;
    calculating an average speed of the interactions of the user;
    analyzing, by the assistive tool, the collected data to build and store a plurality of patterns of the interactions of the user;
    detecting a delay in a current activity of the user on the computer system based on the average speed of the interactions of the user, wherein the delay is a detected period of user inactivity indicative of a hesitation by the user;
    retrieving, based on detecting the delay, data relating to a plurality of prior interactions that the user has carried out in a sequence prior to the delay;
    matching the retrieved data with the stored patterns of the interactions of the user;
    determining one or more probable next steps in the current activity of the user based on the matching;
    presenting the sequence of the prior interactions that the user has carried out so far prior to detecting the delay in the current activity; and
    suggesting, by the assistive tool, at least one of the one or more probable next steps to the user.

2. The method as claimed in claim 1, wherein the monitoring and analyzing are carried out dynamically to update the stored patterns and create new patterns based on on-going monitoring of the interactions of the user.

3. The method as claimed in claim 1, wherein analyzing the collected data includes dividing the collected data into logical blocks of user actions across a plurality of applications and building and storing patterns of the logical blocks.

4. The method as claimed in claim 3, wherein analyzing the collected data includes determining a probability that a logical block follows at least one of the patterns of the logical blocks.

5. The method as claimed in claim 1, wherein retrieving data relating to the prior interactions retrieves recently monitored data and divides it into logical blocks of user actions.

6. The method as claimed in claim 1, wherein the patterns of the interactions of the user include time windows during which the patterns are carried out by the user.

7. The method as claimed in claim 1, wherein if the matching results in more than one stored pattern, selecting a stored pattern based on a probability of the pattern matching the retrieved data.

8. A system for providing assistive technology during interactive computer use, comprising:
    an assistive tool comprising a plurality of instructions stored in a system memory that when executed by a processor of the system implements a plurality of components comprising:
    a monitoring component for monitoring a plurality of interactions of a user with a computer system and collecting data relating to the interactions of the user;
    a data analysis component for analyzing the collected data to build and store a plurality of patterns of the interactions of the user and calculate an average speed of the interactions of the user;
    a delay detection component for detecting a delay in a current activity of the user based on the average speed of the interactions of the user, wherein the delay is a detected period of user inactivity indicative of a hesitation by the user;
    a current activity component for retrieving, based on detecting the delay by the delay detection component, data relating to a plurality of prior interactions that the user has carried out in a sequence prior to the delay;
    a pattern matching component for matching the retrieved data with stored patterns of the interactions of the user and determining one or more probable next steps in the current activity of the user; and
    a suggestion component for suggesting at least one of the one or more probable next steps to the user and presenting the sequence of the prior interactions that the user has carried out so far prior to detecting the delay in the current activity.

9. The system as claimed in claim 8, wherein the monitoring component and the data analysis component monitor and analyze the data dynamically to update the stored patterns and create new patterns based on on-going monitoring of the interactions of the user.

10. The system as claimed in claim 8, wherein the data analysis component for analyzing the collected data includes dividing the collected data into logical blocks of user actions across a plurality of applications and building and storing patterns of the logical blocks.

11. The system as claimed in claim 10, wherein the data analysis component for analyzing the collected data includes determining a probability that a logical block follows at least one of the patterns of the logical blocks.

12. The system as claimed in claim 8, wherein the current activity component for retrieving monitored data relating to the prior interactions retrieves recently monitored data and divides it into logical blocks of user actions.

13. The system as claimed in claim 8, wherein the patterns of the interactions of the user include time windows during which the patterns are carried out by the user.

14. The system as claimed in claim 8, wherein the pattern matching component is for selecting a stored pattern based on a probability of the pattern matching the retrieved data.

15. A computer program product for providing assistive technology during interactive computer use, the computer program product comprising: a computer readable storage medium readable by a processing circuit and storing instructions for execution by the processing circuit for performing a method comprising:
    monitoring a plurality of interactions of a user with a computer system and collecting data relating to the interactions of the user;
    calculating an average speed of the interactions of the user;

analyzing the collected data to build and store a plurality of patterns of the interactions of the user;

detecting a delay in a current activity of the user on the computer system based on the average speed of the interactions of the user, wherein the delay is a detected period of user inactivity indicative of a hesitation by the user;

retrieving, based on detecting the delay, data relating to a plurality of prior interactions that the user has carried out in a sequence prior to the delay;

matching the retrieved data with the stored patterns of the interactions of the user;

determining one or more probable next steps in the current activity of the user based on the matching;

presenting the sequence of the prior interactions that the user has carried out so far prior to detecting the delay in the current activity; and suggesting at least one of the one or more probable next steps to the user.

16. The computer program product as claimed in claim 15, wherein the monitoring and analyzing are carried out dynamically to update the stored patterns and create new patterns based on on-going monitoring of the interactions of the user.

17. The computer program product as claimed in claim 15, wherein analyzing the collected data includes dividing the collected data into logical blocks of user actions across a plurality of applications and building and storing patterns of the logical blocks.

* * * * *